US008311714B2

(12) United States Patent
Seufert et al.

(10) Patent No.: US 8,311,714 B2

(45) Date of Patent: Nov. 13, 2012

(54) METHOD FOR MONITORING A DRIVE TRAIN

(75) Inventors: Martin Seufert, Steinheim (DE); Tobias Kalisch, Villingen-Schwenningen (DE); Markus Goldbach, Heilbronn (DE); Michael Schachtmann, Schonach (DE); Ralf Hettich, Filderstadt (DE); Matthias Neundorf, Villingen (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 189 days.

(21) Appl. No.: 12/822,513

(22) Filed: Jun. 24, 2010

(65) Prior Publication Data

US 2011/0004383 A1 Jan. 6, 2011

(30) Foreign Application Priority Data

Jul. 6, 2009 (DE) ........................ 10 2009 032 220

(51) Int. Cl.
*G06F 17/00* (2006.01)

(52) U.S. Cl. ........................................................ 701/60

(58) Field of Classification Search ........................ None
See application file for complete search history.

(56) References Cited

U.S. PATENT DOCUMENTS

| | | | |
|---|---|---|---|
| 5,416,698 A * | 5/1995 | Hutchison | 701/51 |
| 2008/0208422 A1* | 8/2008 | Shibata et al. | 701/54 |

FOREIGN PATENT DOCUMENTS

| | | |
|---|---|---|
| DE | 10 2007 030 707 A1 | 3/2008 |
| DE | 10 2007 047 917 A1 | 7/2008 |
| DE | 10 2007 027 134 A1 | 12/2008 |
| DE | 10 2007 051 064 A1 | 4/2009 |

* cited by examiner

*Primary Examiner* — Thomas Tarcza

*Assistant Examiner* — Nagi Murshed

(74) *Attorney, Agent, or Firm* — Knobbe, Martens, Olson & Bear, LLP

(57) ABSTRACT

A method for monitoring an automated drive train of a motor vehicle, in particular of a passenger car. The drive train comprises a drive engine, a friction clutch arrangement and a multi-speed transmission. The friction clutch arrangement connects or disconnects the drive engine to/from the multi-speed transmission. The method comprises the step of determining at least one rotational speed parameter of the drive train; checking whether the rotational speed parameter is greater than a first threshold value for a first predetermined time interval, and initiating a measure in the drive train in order to lower the rotational speed parameter if the rotational speed parameter is greater than the first threshold value for the first predetermined time interval.

12 Claims, 2 Drawing Sheets

METHOD FOR MONITORING A DRIVE TRAIN

CROSS-REFERENCE TO RELATED APPLICATIONS

This application claims the priority of German patent application DE 10 2009 032 220, filed Jul. 6, 2009.

BACKGROUND OF THE INVENTION

The present invention relates to a method for monitoring an automated drive train of a motor vehicle, in particular of a passenger car, which drive train comprises a drive engine, a friction clutch arrangement and a multi-speed transmission, the friction clutch arrangement connecting or disconnecting the drive engine to/from the multi-speed transmission.

Such automated drive trains are generally known in the form of automated manual transmissions (ASG) and dual clutch transmissions (DKG). In such automated drive trains, monitoring of operating parameters is frequently carried out in order to determine whether an equipment-endangering or even safety-threatening situation occurs in operation.

It is known, for example, from the document DE 10 2007 030 707 A1 to prevent an overspeed condition in a converter automatic transmission or a dual clutch transmission. In this case the speed of the drive engine is monitored. A first threshold value is set as a function of an operating condition. If the engine speed and/or the rotational speed of the transmission drive shaft exceeds the first threshold value an active intervention in the engine control system is made in order to reduce the engine torque.

From the document DE 10 2007 027 134 A1 it is known to execute such a torque reduction in either a hard or a soft manner, depending on whether a first rotational speed threshold or a second rotational speed threshold is exceeded.

BRIEF SUMMARY OF THE INVENTION

Against this background it is an object of the invention to specify an improved method for monitoring an automated drive train, and a drive train as such.

The above object is achieved, on the one hand, by a method for monitoring an automated drive train of a motor vehicle, in particular of a passenger car, which drive train comprises a drive engine, a friction clutch arrangement and a multi-speed transmission, the friction clutch arrangement connecting or disconnecting the drive engine to/from the multi-speed transmission, comprising the steps:

- determining at least one rotational speed parameter of the drive train;
- checking whether the rotational speed parameter is greater than a first threshold value for a first predetermined time interval, and
- initiating a measure in the drive train to reduce the rotational speed parameter if the rotational speed parameter is greater than the first threshold value for the first predetermined time interval.

The above object is further achieved by a drive train of a motor vehicle, in particular of a passenger car, which drive train comprises a drive engine, at least one friction clutch arrangement, a multi-speed transmission and a control device for controlling the drive train, the friction clutch arrangement connecting or disconnecting the drive engine to/from the multi-speed transmission and such a method being implemented in the control device.

In automated drive trains of motor vehicles, rotational speeds which may result in material damage to the drive engine, to the friction clutch arrangement and/or to the multi-speed transmission may occur. Furthermore, excessive rotational speeds can also lead to safety-critical states, in particular when there is a danger that such material damage leads to locking of the drive train and therefore to loss of adhesion of the driven wheels.

Through the measure according to the invention, whereby a rotational speed parameter of the drive train is monitored not only for exceeding a threshold value, but to determine whether a rotational speed parameter is greater than a first threshold value for a first predetermined time interval, unnecessary error correction measures can be avoided. Such error correction measures generally have the disadvantage that they can lead to impairment of vehicle comfort.

In this case the first predetermined time interval is calculated such that a brief exceeding of the first threshold value for a time interval shorter than the first predetermined time interval is not critical. If the rotational speed parameter exceeds the first threshold value only briefly as a result of transient conditions, therefore, no error correction measure is initiated.

If, however, the rotational speed parameter is exceeded for the first predetermined time interval or longer, appropriate measures for lowering the rotational speed parameter can be initiated by means of the method according to the invention.

Consequently, a good compromise between a high safety level and a high comfort level can be achieved with the automated actuation of the drive train.

The rotational speed parameter may be a rotational speed or a gradient thereof, a gradient being understood to mean a first or second differentiation of the rotational speed. Furthermore, the determination of the rotational speed may be effected either directly by means of a suitable rotational speed sensor or, alternatively, it is possible to calculate the rotational speed indirectly, for example by measuring another rotational speed or another parameter and deducing the rotational speed therefrom by mathematical methods (for example, in order to measure an input rotational speed of a transmission, the rotational speed of the driven wheels may be used in order to calculate therefrom the rotational speed of the transmission input shaft via the gear ratio in the multi-speed transmission and, if appropriate, a gear ratio of an axle differential).

Furthermore, the automated drive train may be an ASG or a DKG. However, the drive train may also include a converter automatic transmission, in which case the friction clutch arrangement is formed by the converter and/or by clutches or brakes in the automatic transmission.

The object is therefore achieved in its entirety.

According to an especially preferred embodiment, the rotational speed parameter is a speed of the drive engine or a gradient thereof.

In this embodiment it is monitored whether the engine speed is greater than a first threshold value over the first predetermined time interval.

An excessive engine speed may occur, for example, with an incorrectly selected gear, but also when travelling downhill, for example. In the latter case, because of the coasting mode, it is not possible to limit the engine speed solely on the basis of an engine speed limiting routine generally present in an engine control system in any case. In this case it may be necessary to ensure a suitable engine speed reduction by more extensive measures in the friction clutch arrangement and/or in the multi-speed transmission.

According to a further preferred embodiment, the rotational speed parameter is a transmission input speed of the multi-speed transmission or a gradient thereof.

With a friction clutch, the transmission input speed is generally equal to the speed of an output member of the friction clutch arrangement. If the latter is too high, this can cause destruction of the friction clutch arrangement and in some cases, in the event of detachment of friction linings or the like, locking of the drive train.

In this case, too, it may be necessary to initiate appropriate measures in the friction clutch arrangement itself or in the multi-speed transmission.

According to a further preferred embodiment, the drive train includes a shaft arrangement comprising a hollow shaft and an inner shaft mounted concentrically therein, the rotational speed parameter being a rotational speed differential between the hollow shaft and the inner shaft, or a gradient thereof.

Such a shaft arrangement is used, in particular, in dual clutch transmissions, specifically as a transmission input shaft arrangement. In this case the hollow shaft and the inner shaft are mounted with respect to one another by means of bearings (for example, needle bearings). An excessive speed differential can cause bearing damage, and such bearing damage can even lead to locking of the hollow shaft and the inner shaft, and consequently to a loss of adhesion of the driven wheels.

If a forward gear is engaged in each of the two partial transmissions of a dual clutch transmission, the speed differential is yielded by subtraction of the speeds from one another. However, if a reverse gear is engaged in one partial transmission and a forward gear in the other partial transmission, the speed differential can be yielded by addition of the speeds. This case is of especial importance with dual clutch transmissions, since very high speed differentials, which may lead to bearing damage, can occur in such transmissions.

Checking of the speed differential between the hollow shaft and the inner shaft, or of a gradient thereof, may preferably also be effected only if a reverse gear is engaged. Utilisation of the electronic control device of the drive train can thereby be optimised.

In general, it is further preferred if at least two different rotational speed parameters of the drive train are checked (preferably selected from engine speed, transmission input speed and speed differential), a method for reducing the respective speed parameter being initiated if at least one of the two speed parameters exceeds a respective first threshold value for a respective first time interval.

In this case the individual rotational speed parameters may have different first threshold values, although they may also have identical threshold values. Furthermore, the respective first time interval for each rotational speed parameter may be set differently, although they may also be identical for each rotational speed parameter.

Depending on which kind or rotational speed parameter exceeds the respective first threshold value for the respective first predetermined time interval, various measures or combinations of measures may be initiated in order to lower the respective rotational speed parameter.

According to a preferred embodiment, the measure for lowering the rotational speed parameter comprises lowering the torque delivered by the drive engine.

This may be effected by reducing the fuel supply to the engine or by other methods.

According to a further preferred embodiment, the measure comprises disengaging a friction clutch of the friction clutch arrangement.

If, as described above, a torque-reducing measure does not necessarily lead to a lowering of the rotational speed parameter (as when travelling downhill), a preferred method may be to disengage the power-transmitting friction clutch.

In this case the measure for reducing the torque of the drive engine may be effective immediately in reducing the engine speed.

According to a further preferred embodiment, the measure comprises selecting a different gear in the multi-speed transmission.

It is thereby possible to reduce rotational speeds in the multi-speed transmission, in particular the speed of the transmission input shaft(s) or the speed differential between hollow shaft and inner shaft.

In the case of a dual clutch transmission, a different gear may be engaged, in particular in the inactive partial transmission which does not transmit power, for the purpose of reducing the rotational speed of the associated transmission input shaft, in order to lower the rotational speed of said gear.

It is further advantageous if the measure comprises shifting the multi-speed transmission to neutral.

In this case, propagation of overspeed conditions in the transmission via an engaged shifting clutch can be prevented.

According to a further preferred embodiment, the multi-speed transmission is a dual clutch transmission with a first and a second partial transmission, one of which is active and the other inactive.

In this case, as is usual with dual clutch transmissions, a gear may be preselected in the inactive partial transmission. The selection of this gear may in some cases lead to overspeed conditions, for example at the transmission input shafts (speed differential). According to a preferred embodiment, therefore, it is possible to execute the measure in the inactive partial transmission, that is, for example, to engage a different gear in that transmission or to shift the inactive multi-speed transmission to neutral.

In this case, according to a further preferred embodiment, the measure comprises disengaging a gear (shifting to neutral) in the active partial transmission, the active partial transmission being unloaded prior to this step.

Because either a traction and overrun mode is generally present in the active partial transmission, unloading of the partial transmission may be effected, for example, by increasing or reducing the engine torque. Thereby, disengagement of the shifting clutch of the engaged gear may be carried out.

It is further advantageous if the measure comprises braking the motor vehicle.

With the friction clutch arrangement engaged, this measure can lead to a reduction in engine speed even if it causes high wear of the brake apparatus. Especially if the friction clutch opening is disengaged or has been disengaged for the purpose of over-speeding, this measure can lead to an immediate reduction of rotational speeds also in the multi-speed transmission, in particular of the input shaft speed(s).

According to a further embodiment, which is preferred overall, the method is carried out in a first process in an electronic control device, at least one rotational speed parameter of the drive train being checked, in a parallel second process, as to whether the rotational speed parameter is greater for a second predetermined time interval than a second threshold value which is greater than the first threshold value, whereupon, should this be the case, the control device is reset in order to bring about a non-safety critical state of the drive train.

This embodiment therefore comprises, in the electronic control device, two processes taking place substantially in parallel, the first of which processes serves to eliminate error states, which in the great majority of cases can be eliminated by suitable measures. The second process, by contrast, is a safety-relevant process which becomes active if a second threshold value, which is greater than the first threshold value, is exceeded for a second predetermined time interval.

The second predetermined time interval may be equal to or greater than the first predetermined time interval, but is preferably shorter than the first predetermined time interval.

The second process is generally implemented by software which has been tested for absence of faults. The second process is therefore suited to eliminating safety-critical states. As a rule the second process serves as an "emergency process", in case the first process has not led to a sufficient reduction of the relevant rotational speed parameter.

In this case the second process may otherwise be configured substantially identically to the first process in terms of functions.

In the present context, a reset of the control device may be understood to mean a process in which the drive train is brought back to a non-safety critical state. Such a reset may also be triggered by other processes of the control device.

With automated manual transmissions and dual clutch transmissions, such a reset generally leads to immediate disengagement of the friction clutch arrangement (the friction clutch or clutches contained therein as a rule being in the form of normally-open clutches).

This is because, as a rule, the supply voltage for supplying the actuators which actuate the friction clutch arrangement is interrupted during the reset, so that the actuator or actuators are immediately de-energised.

The above-described measures for lowering the rotational speed parameter may be employed individually or in combination.

Furthermore, the following measures may also be taken individually or in combination therewith:

The multi-speed transmission may also be shifted to a neutral position. The multi-speed transmission concerned may also be shifted to a neutral position and the associated friction clutch may then be engaged.

In a dual clutch transmission, both partial transmissions may be shifted to a neutral position. In this case one or both friction clutches of the friction clutch arrangement of the dual clutch transmission may additionally be engaged.

The engagement of a different gear may be executed in one or both partial transmissions of the dual clutch transmission.

In total, said functions can prevent damage to the drive engine, to the friction clutch arrangement and/or to the multi-speed transmission through overspeed conditions. Safety-critical states, material damage and personal injury are prevented thereby. The method according to the invention can be implemented solely through software. Hardware solutions for lowering the rotational speed parameter are therefore unnecessary, so that costs are reduced. Because damage to the components of the drive train is avoided, service life is increased.

It is self-evident that the features mentioned hereinbefore and to be explained hereinafter can be used not only in the particular combination specified, but also in other combinations or in isolation, without departing from the scope of the present invention.

BRIEF DESCRIPTION OF THE SEVERAL VIEWS OF THE DRAWING

Exemplary embodiments of the invention are represented in the drawing and are explained in more detail in the following description. In the drawing.

DETAILED DESCRIPTION OF THE INVENTION

Figure 1:
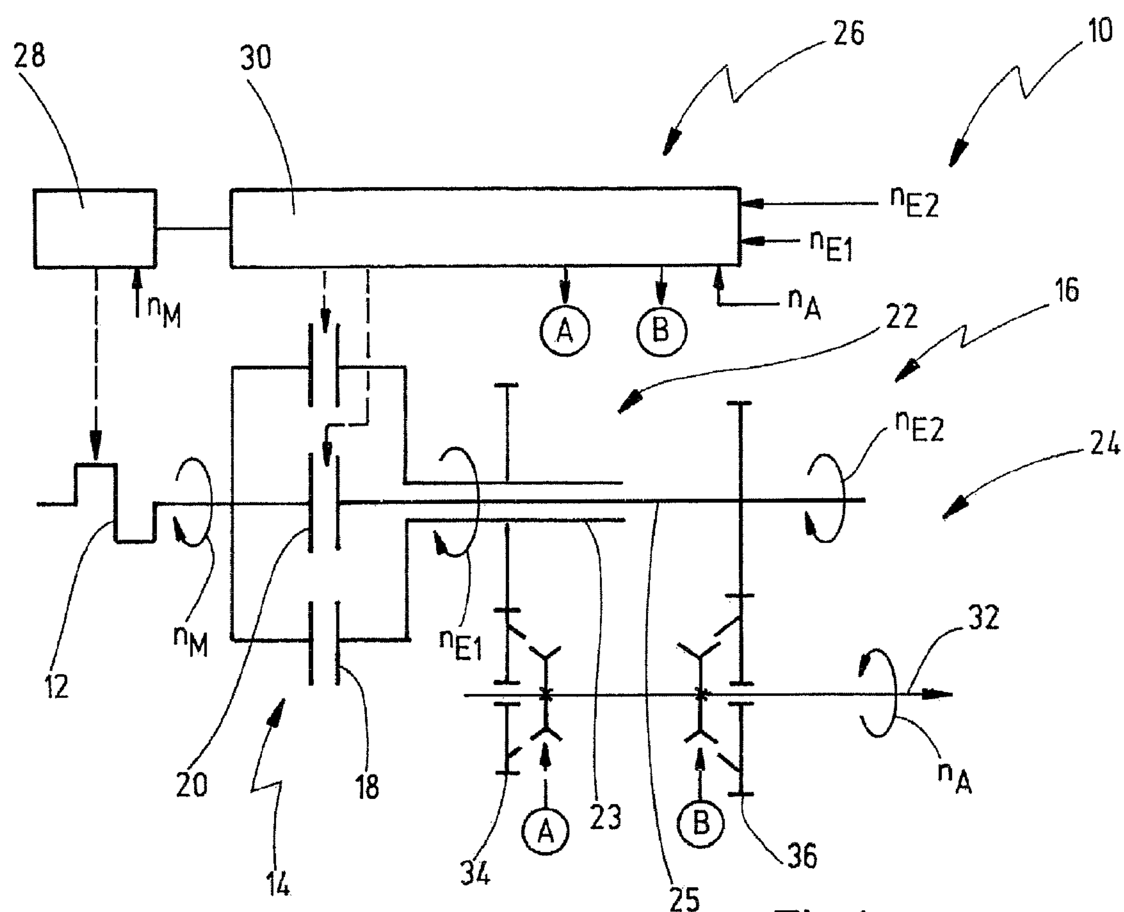
FIG. 1 is a schematic representation of an embodiment of a drive train according to the invention.

In FIG. 1 a drive train of a motor vehicle, in particular of a passenger car, is denoted generally by 10.

The drive train 10 has a drive engine 12 which may be formed, for example, by an internal combustion engine or a hybrid drive unit.

The drive train further has a friction clutch arrangement 14 and a multi-speed transmission 16. The friction clutch arrangement 14 connects the drive engine 12 to the multi-speed transmission 16 or disconnects the multi-speed transmission 16 from the drive engine 12.

In the present case the multi-speed transmission 16 is designed as a dual clutch transmission. Accordingly, the friction clutch arrangement 14 comprises a first friction clutch 18 and a second friction clutch 20. The multi-speed transmission 14 comprises a first partial transmission 22, which includes, as the transmission input shaft, a hollow shaft 23 which is connected to an output member of the first friction clutch 18. In addition, the multi-speed transmission 16 includes a second partial transmission 24, the transmission input shaft of which is in the form of an inner shaft 25 mounted concentrically inside the hollow shaft 23. The inner shaft 25 is connected to an output member of the second friction clutch 20.

The drive train further includes a control device 26, which may include an engine control device 28 and a transmission control device 30. The engine control device 28 and the transmission control 30 device may be formed by a single control device or may be in communication with one another, as is indicated by a connecting line in FIG. 1.

A transmission output of the multi-speed transmission 16 is shown at 32.

The odd-number gear speeds (i.e. gear speeds 1, 3, 5, etc.) are allocated, for example, to the first partial transmission 22. Correspondingly, the second partial transmission 24 may include the even-number gear speeds (i.e. gear speeds 2, 4, 6 etc.). Shown in FIG. 1 to represent the gear speeds is a wheel set 34 which is associated with the first partial transmission 22. In addition, a second wheel set 36 associated with the second partial transmission 24 is shown. The partial transmissions 22, 24 are in the form of spur gear transmissions in a countershaft configuration.

The drive train 10 may be designed for longitudinal installation in a vehicle or for transverse installation in a vehicle.

Also represented schematically in FIG. 1 are an engine speed $n_M$ of the drive engine 12 and a first transmission input speed $n_{E1}$ of the first partial transmission (i.e. =rotational speed of the hollow shaft 23), and a second transmission input speed $n_{E2}$ (i.e. the rotational speed of the inner shaft 25). A rotational speed of the transmission output 32 is shown at $n_A$.

FIG. 1 also shows that the engine control device 28 acts in a controlling manner on the drive engine 12 and receives the engine speed $n_M$ as an input signal. FIG. 1 further shows that the transmission control device 30 acts in a controlling manner on the two friction clutches 18, 20 and on shifting clutches for engaging and disengaging the gear speeds. Consequently, the transmission control device 30 also controls the friction clutch arrangement 14. The transmission control device 30 further receives the speeds $n_{E1}$, $n_{E2}$ of the transmission input shafts 23, 25, and the speed $n_A$ of the transmission output 32.

The transmission speeds may either be measured directly by sensors or obtained by calculation, for example using the rotational speeds of the driven wheels while taking account of the transmission ratios employed.

Figure 2:
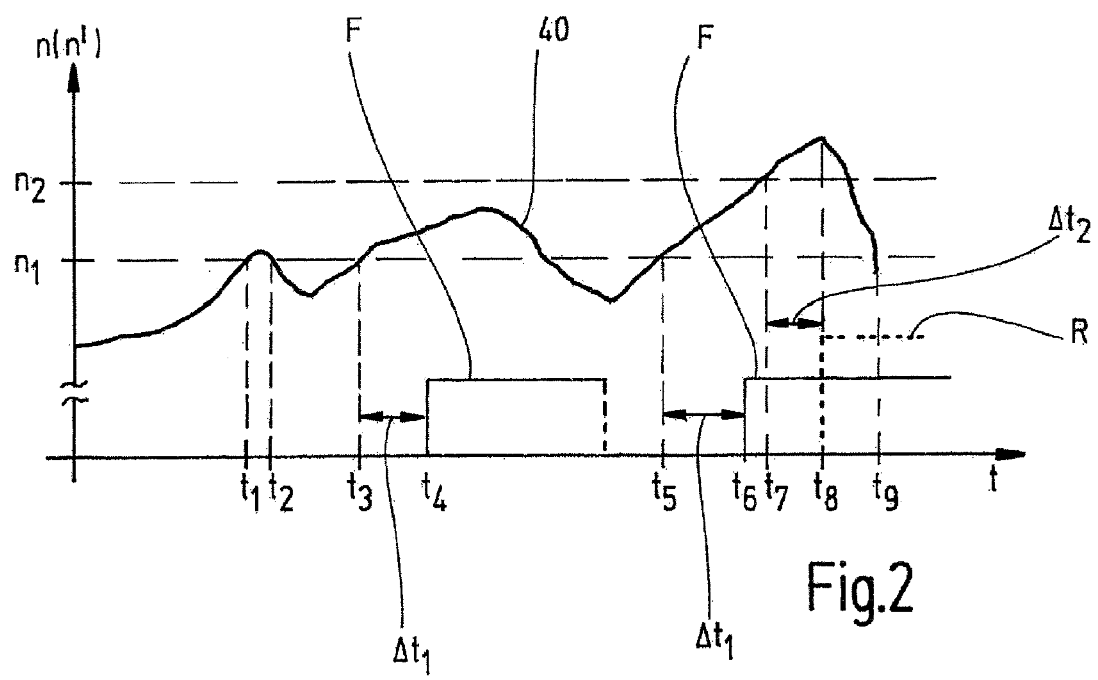
FIG. 2 is a schematic representation of the curve of a rotational speed parameter over time.

FIG. 2 shows in schematic form an exemplary curve of a rotational speed parameter n (or of the gradient n' thereof) over time. The rotational speed parameter is also denoted by 40 in FIG. 2. In the present case it is assumed, without restriction of general validity, that the rotational speed parameter n is the engine speed $n_M$, one of the transmission input speeds $n_{E1}$, $n_{E2}$ or the speed differential thereof. $\Delta n_E$. For simplicity, only the engine speed $n_M$ will be referred to hereinafter.

In FIG. 2 a first threshold value is drawn at $n_1$, together with a second threshold value $n_2$, which is greater than the first threshold value $n_1$.

In the example shown in FIG. 2, the engine speed $n_M$ rises over time up to a first time $t_1$. At time $t_1$ the engine speed $n_M$ exceeds the first threshold value $n_1$, but relatively shortly thereafter (at $t_2$) falls back below the threshold value $n_1$. The time interval between $t_1$ and $t_2$ is so short that it is not recognised as problematic by the method according to the invention, so that no further measures are initiated. At time $t_3$ the engine speed $n_M$ again rises above the first threshold value $n_1$. In this case the engine speed $n_M$ remains above the first threshold value $n_1$ for a time interval $\Delta t_1$. This is recognised by the method according to the invention as an error situation, so that at time $t_4$ (after the first predetermined time interval $\Delta t_1$ has elapsed) an error flag F is set. With the setting of the error flag F the control device 26 initiates measures for lowering the engine speed $n_M$, so that soon afterwards the engine speed $n_M$ falls back below the first threshold value $n_1$. The measures initiated by the control device 26 may comprise a single measure (e.g. lowering the engine torque), or a plurality of measures, as explained in detail in the introduction, in combination.

In a second example shown in FIG. 2 the engine speed $n_M$ again rises at a time $t_5$ above the first threshold value $n_1$. At the time $t_6$, i.e. after the first predetermined time interval $\Delta t_1$ has elapsed, measures are again initiated by the control device 26 (the flag F is set). However, in this second example the measures initiated do not bring the desired success, so that the engine speed $n_M$ exceeds the second threshold value $n_2$ at time $t_7$. In this case it is monitored whether the engine speed $n_M$ remains above the second threshold value for a second predetermined time interval $\Delta t_2$, which is the case in the present example. Consequently, at the time $t_8$ a reset flag R is set, entailing an immediate reset at least of the control device 30 and optionally of the entire control device 26. With the reset, the friction clutches 18, 16 are immediately disengaged, since, as a result of the resetting of the transmission control device 30, the corresponding actuators for engaging the friction clutches 18, 20 are de-energised, and the friction clutches 18, 20 are designed to be normally open. In addition, a reset of the engine control device 28 interrupts the fuel supply to the drive engine 12, so that the torque thereof decreases. In sum, a situation is produced in which the engine speed $n_M$ decreases and at time $t_9$ again falls back below the first threshold value $n_1$.

Figure 3:
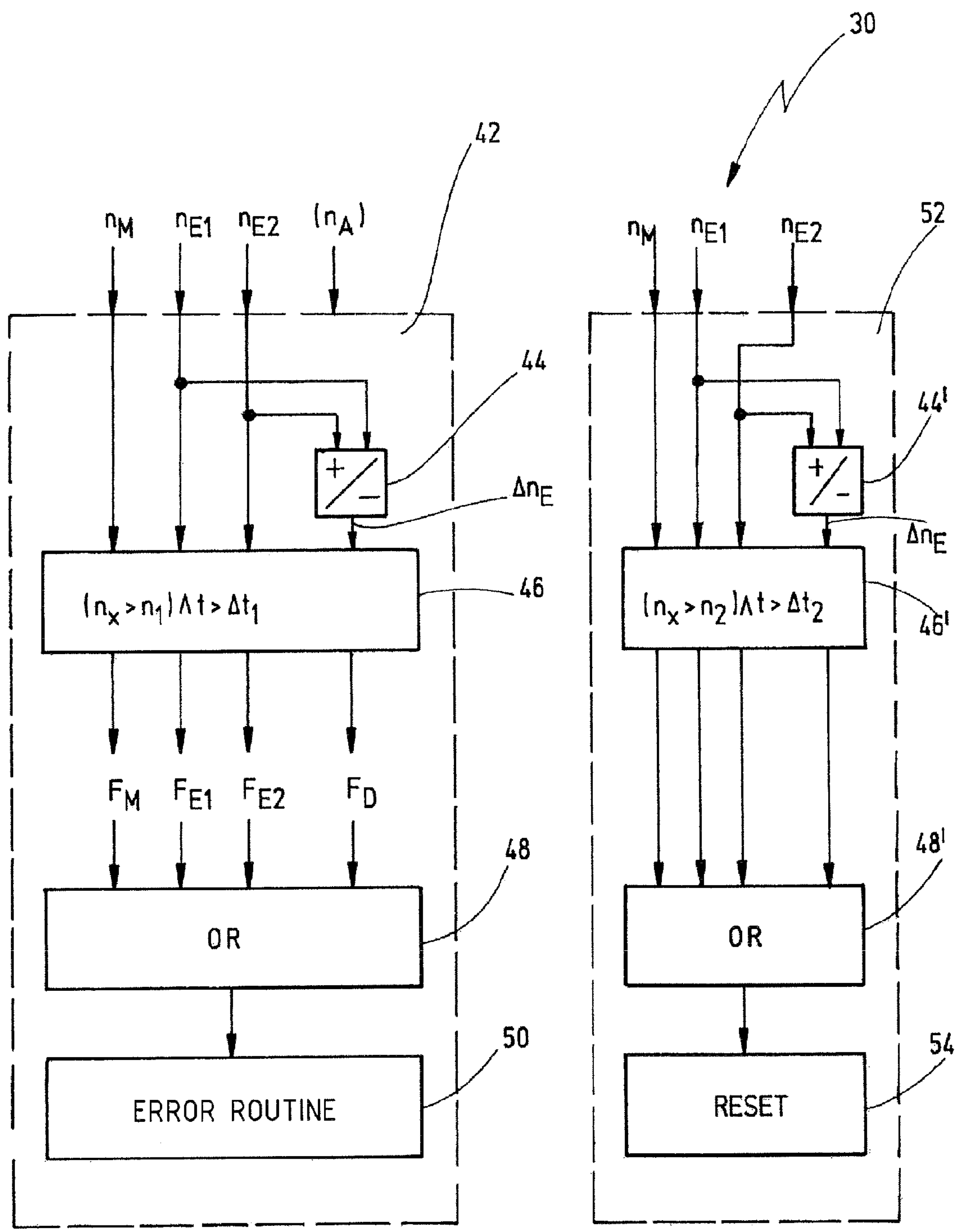
FIG. 3 is a schematic representation of a first and a second process which can be arranged for implementing the method according to the invention.

FIG. 3 shows in schematic form a first process 42 which is implemented in the transmission control device 30. The first process 42 receives as input signals the engine speed $n_M$ and the transmission input speeds $n_{E1}$, $n_{E2}$, and optionally the output speed $n_A$.

In an add/subtract module 44 the transmission input speeds are interconnected either additively or subtractively, depending on whether a forward gear is engaged in both partial transmissions 22, 24 (in this case the transmission input speeds are subtracted from one another), or whether a reverse gear is engaged in one partial transmission and a forward gear in the other partial transmission (in this case the transmission input speeds are added).

In a test module 46 it is tested whether a respective speed parameter $n_x$ is greater than a first threshold value $n_1$. It is also tested whether this condition is fulfilled for a time interval greater than $\Delta t_1$.

This test module 46 checks the condition for each of the speed parameters $n_M$, $n_{E1}$, $n_{E2}$ and for the output of the add/subtract module 44, which is denoted by $\Delta n_E$. The threshold values $n_1$ may be different for each of the rotational speed parameters. The same applies to the first predetermined time interval $\Delta t_1$. If the above conditions are fulfilled in the test module 46, the test module 46 outputs an error flag $F_M$, $F_{E1}$, $F_{E2}$ and/or $F_D$ for the respective rotational speed parameter.

These error flags are interconnected with one another in an interconnect module 48 by an OR interconnection. If only one of the error flags $F_M$, $F_{E1}$, $F_{E2}$, $F_D$ is set, an error routine 50 is initiated. This then initiates further measures, which may depend on which of the error flags is set.

The process 42 is implemented in the control device 30 as a software process, specifically at a high level which has not been tested for errors down to the last detail.

Because overspeed conditions can lead to safety-critical states, a second process 52, also represented in FIG. 3, is implemented in the transmission control device 30.

The second process 52 is a process tested in detail on a different (deeper) software level than the first process 42. The second process 52 may have similar or identical functions to the first process 42. In the present case this is represented by the fact that the second process 52 receives substantially the same rotational speed parameters. In a corresponding manner, the second process 52 has an add/subtract module 44', a test module 46' and an interconnect module 48'. In the test module 46' the respective rotational speed parameter $n_x$ is interrogated as to whether it exceeds a second threshold value $n_2$ for a second predetermined time interval $\Delta t_2$. The second threshold value $n_2$ is preferably greater than the first threshold value $n_1$. It is further preferred if the second predetermined time interval $\Delta t_2$ is less or shorter than the first predetermined time interval $\Delta t_1$.

The second process 52 is a safety-relevant process and, instead of an error routine 50, the output of the interconnect module 48' is connected to a reset routine 54 by means of which the transmission control device 30 is reset, so that the friction clutches 18, 20 are immediately disengaged.

The abovementioned threshold values $n_1$, $n_2$ are, as mentioned, rotational-speed-parameter specific values and also values which depend on the drive train concerned (for example, in the case of a drive engine 12 in the form of a diesel engine, the first threshold value $n_1$ may be significantly lower than in the case of a drive engine 12 which is set up for petrol operation or is designed as a sports engine.

The predetermined time intervals $\Delta t_1$, $\Delta t_2$ are in all cases greater than 0, but preferably longer than 50 ms, in particular longer than 100 ms.

What is claimed is:

1. Method for monitoring an automated drive train of a motor vehicle, which drive train comprises a drive engine, a friction clutch arrangement, a multi-speed transmission and a control device that controls the drive train, the friction clutch arrangement connecting or disconnecting the drive engine to/from the multi-speed transmission, comprising the steps:

determining at least one rotational speed parameter of the drive train, wherein the rotational speed parameter is at least one of an engine speed of the drive engine or a gradient thereof, a transmission input speed of the multi-speed transmission or a gradient thereof, and a speed differential between a hollow shaft and an inner shaft or gradient thereof when the drive train has a shaft arrangement consisting of the hollow shaft and the inner shaft mounted concentrically therein;

checking with the control device whether the rotational speed parameter is greater than a first threshold value for a first predetermined time interval, and initiating with the control device a measure in the drive train in order to lower the rotational speed parameter if the rotational speed parameter is greater than the first threshold value for the first predetermined time interval.

2. Method according to claim 1, wherein at least two different rotational speed parameters of the drive train are checked, a measure for lowering one of the respective rotational speed parameters being initiated if at least one of the two rotational speed parameters exceeds a respective first threshold value for a respective first time period.

3. Method according to claim 1, wherein the measure comprises lowering the torque delivered by the drive engine.

4. Method according to claim 1, wherein the measure comprises disengaging a friction clutch of the friction clutch arrangement.

5. Method according to claim 1, wherein the measure comprises engaging a different gear in the multi-speed transmission.

6. Method according to claim 1, wherein the measure comprises shifting the multi-speed transmission to neutral.

7. Method according to claim 1, wherein the multi-speed transmission is a dual Clutch transmission with a first and a second partial transmission, one of which is active and the other inactive.

8. Method according to claim 7, wherein the measure is carried out in the inactive partial transmission.

9. Method according to claim 7, wherein the measure comprises disengaging a gear in the active partial transmission, and in that the active partial transmission is unloaded prior to this step.

10. Method according to claim 1, wherein the measure comprises braking the motor vehicle.

11. Method according to claim 1, wherein in that the method is carried out in a first process in an electronic control device, and in that in a parallel second process at least one rotational speed parameter of the drive train is checked as to whether the rotational speed parameter for a second predetermined time interval is greater than a second threshold value which is greater than the first threshold value and, if this is the case, the control device is reset in order to bring about a non-safety critical state of the drive train.

12. Automated drive train of a motor vehicle, which drive train comprises a drive engine, at least one friction clutch arrangement, a multi-speed transmission and a control device for controlling the drive train, wherein the friction clutch arrangement connects or disconnects the drive engine to/from the multi-speed transmission, and wherein a method for monitoring the drive train being implemented in the control device includes determining at least one rotational speed parameter of the drive train, wherein the rotational speed parameter is at least one of an engine speed of the drive engine or a gradient thereof, a transmission input speed of the multi-speed transmission or a gradient thereof, and a speed differential between a hollow shaft and an inner shaft or a gradient thereof when the drive train has a shaft arrangement consisting of the hollow shaft and the inner shaft mounted concentrically therein;

checking whether the rotational speed parameter is greater than a first threshold value for a first predetermined time interval; and initiating a measure in the drive train in order to lower the rotational speed parameter if the rotational speed parameter is greater than the first threshold value for the first predetermined time interval.

* * * * *